Figure 6:
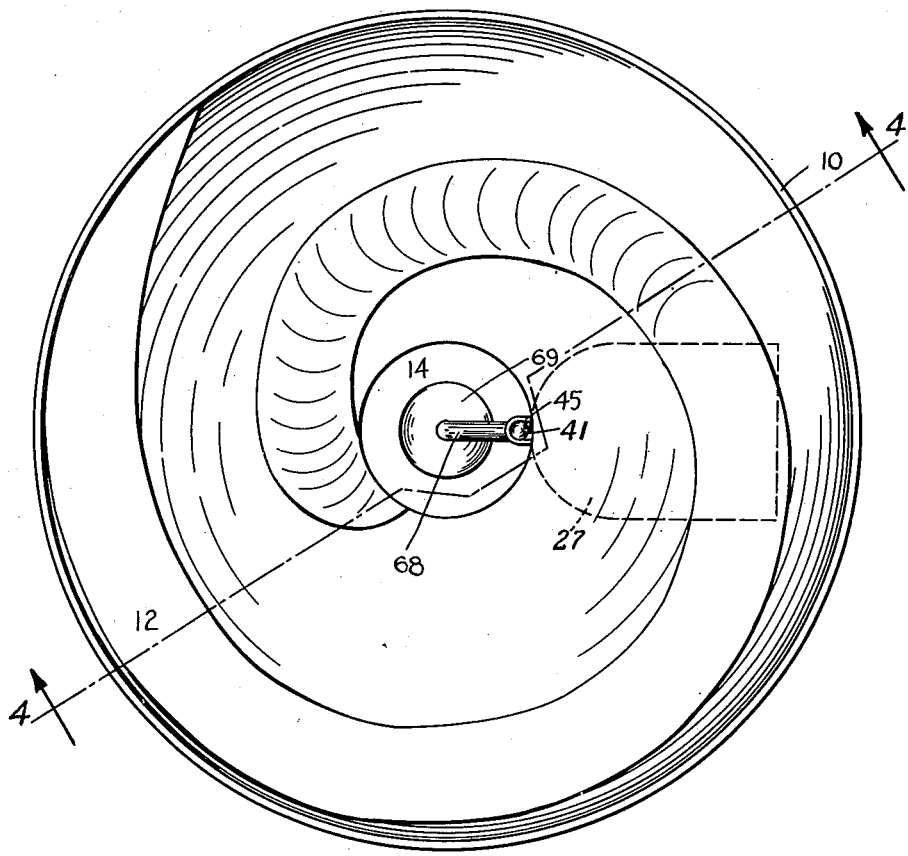

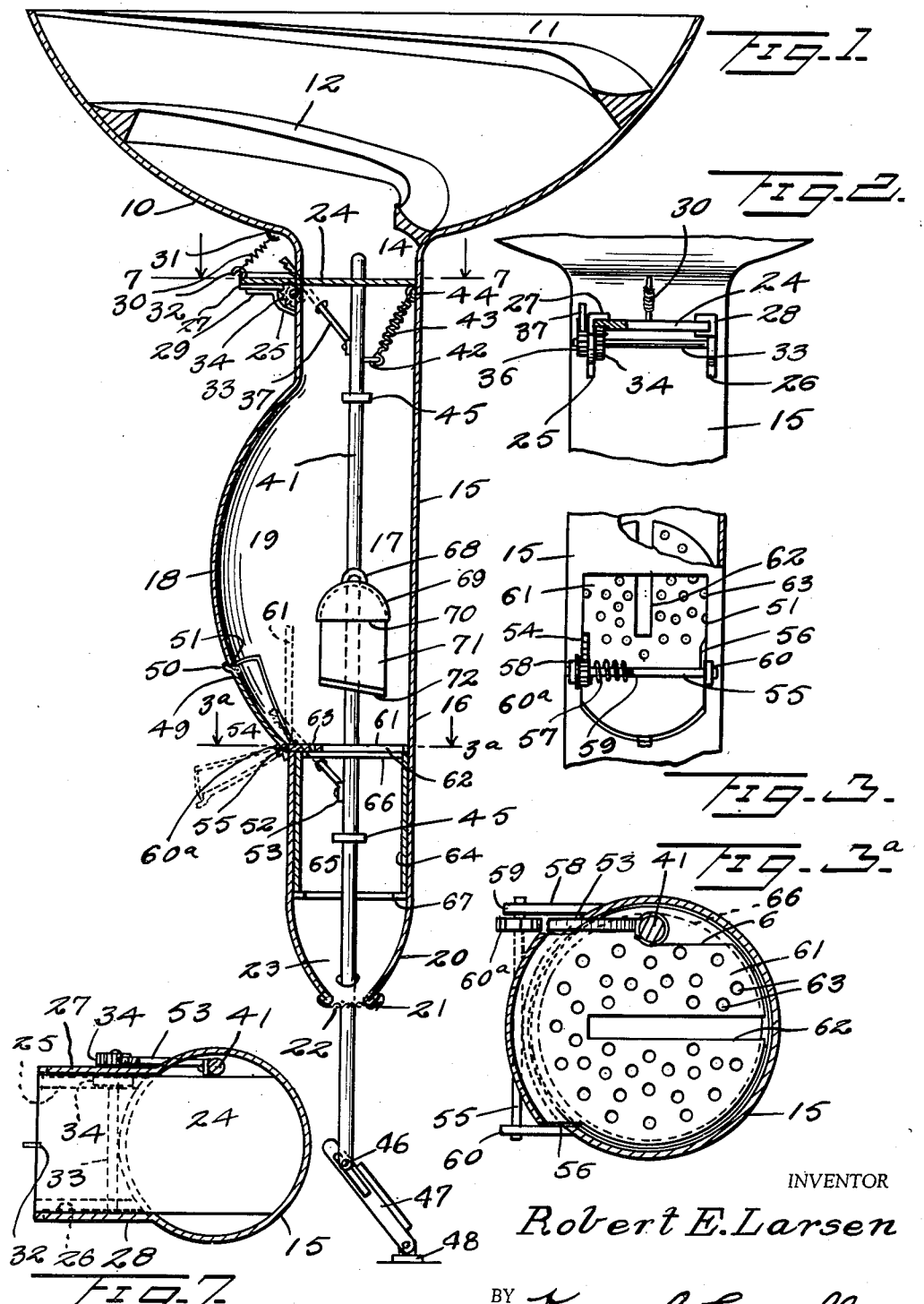

June 3, 1952  R. E. LARSEN  2,599,464
CITRUS FRUIT JUICER
Filed March 4, 1946  3 Sheets-Sheet 2
Fig. 4.
Fig. 5.
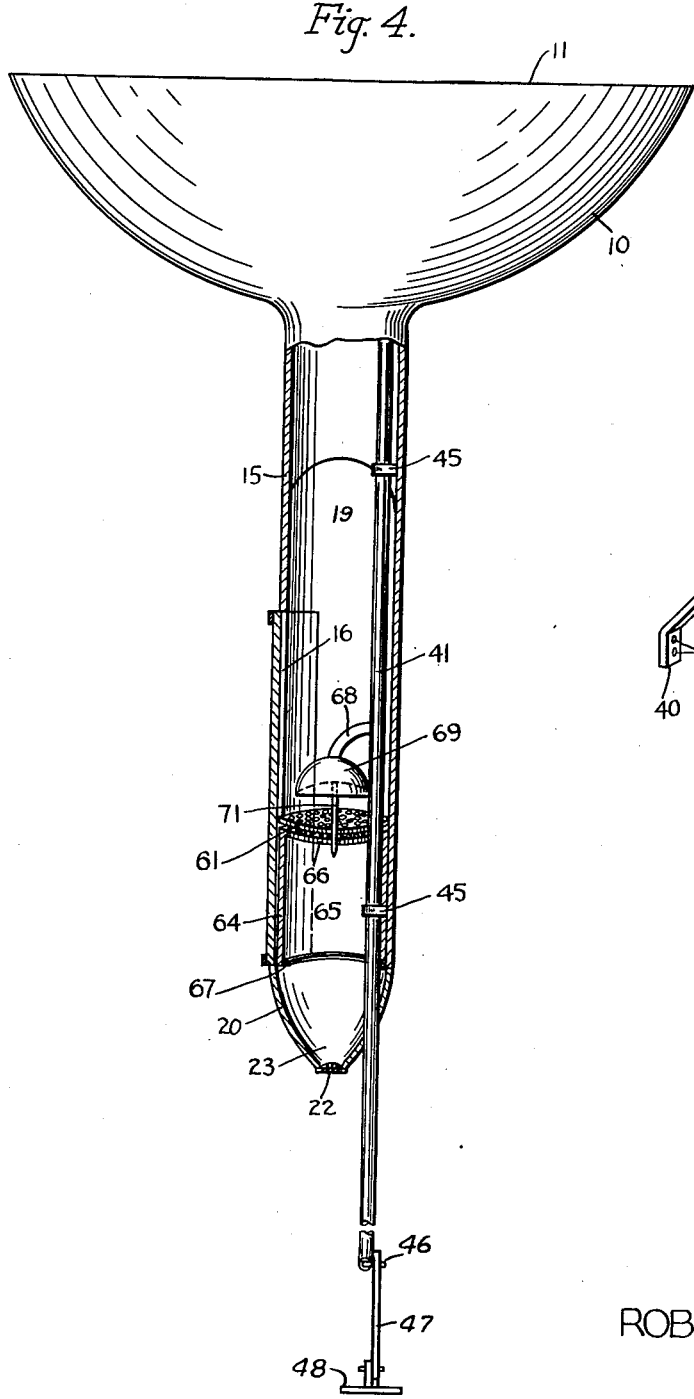
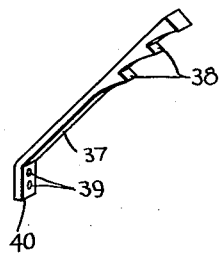
Inventor
ROBERT E. LARSEN
By
Kimmel & Crowell, Attorneys Inventor
ROBERT E. LARSEN
By Kimmel & Crowell,
Attorneys Patented June 3, 1952

2,599,464

UNITED STATES PATENT OFFICE 2,599,464

CITRUS FRUIT JUICER

Robert E. Larsen, Chicago, Ill.

Application March 4, 1946, Serial No. 651,876

13 Claims. (Cl. 100—41)

The present invention relates to improvements in citrous fruit juice extraction means and has for its object to provide a simple, efficient and inexpensive device of this character.

One of the main objects thereof is to provide improved means for dejuicing and slicing oranges and other citrous fruits by foot-operated mechanism.

Another object thereof is to provide mechanism for ejecting orange peels from the machine after the oranges have been sliced and dejuiced.

A further object thereof is to provide improved unitary mechanism for simultaneously operating the orange dejuicer, slicer, and peel ejecting device.

A still further object is to provide a sturdy, dependable machine for rapidly and effectively slicing and crushing oranges and other citrous fruit, one after the other directly from a magazine or hopper into which a plurality of oranges are initially placed.

Another object of this invention is to provide a citrous fruit juice extractor which can readily be caused to issue a stream of orange juice from the machine, with provision for ejecting what remains of each orange as fast as same has been dejuiced.

A further object thereof is to provide improved means for controlling the feed of oranges into the machine, one after the other with due regard to the time element involved for completing the crushing operation of each successive orange.

Another object thereof is to provide means for synchronizing the operations of admitting oranges into the machine from the hopper in which they are initially stored and the means for effecting the dejuicing operation thereof.

A further object is to provide a machine for progressively feeding, centering, slicing and crushing citrous fruit in a manner to express the juices thereof in a steady stream in order that same may fill a receptacle mounted thereunder.

Another object is to provide, in a device of the kind described, a hopper having a depending chute in which is mounted a trap door for dropping one orange at a time out of the hopper into the chute for a crushing operation, this trap door being automatically actuated in time with the orange crushing operation.

Another object thereof is to provide in a device of the kind described, a rod or plunger as a means of performing the orange slicing and crushing operation, this plunger being provided with a combination dual slicer and crusher element which is carried down into engagement with an orange seated upon an orange rest mounted in the chute of the machine by foot-operated means.

A still further object of this invention is to provide improved means for removing the orange peel from the machine automatically just after an orange has been sliced and crushed and before the next orange is brought to rest for a slicing and crushing operation.

A further object thereof is to provide, in a device of the kind described, improved means for causing certain operations to take place in the machine during the down stroke of a plunger rod and certain other operations take place during its return or up stroke. In carrying out this principle of operation one orange is cut and crushed during the down stroke of the plunger in the orange receiving chute, and the orange peel is discharged during the up stroke. At the completion of the up stroke a fresh orange is admitted and the machine is in position for another cycle of operation. The synchronization thus produced is all effected by the reciprocation made by the plunger, induced by a treadle actuating element.

With the above and other objects in view, my invention consists in the combination, arrangement and details of construction disclosed in the drawings and specification, and then more particularly pointed out in the appended claims.

In the drawings, wherein similar reference characters designate similar parts throughout the respective views, Figure 1 is a sectional elevation of my invention, Figure 2 is a fragmental detail view in elevation of the chute showing the mounting of the trap door therein, Figure 3 is another fragmental detail view of the chute in elevation showing the mounting of the peel ejecting door therein, Figure 3a is a sectional view taken on the line 3a—3a of Figure 1, Figure 4 is a view similar to Figure 1 but taken in a plane at right angles thereto, Figure 5 is a perspective view of a detent, Figure 6 is a top plan view of the hopper, and Figure 7 is a sectional view taken along the line 7—7 of Figure 1, as viewed in the direction of the arrows.

In the drawings, which are merely illustrative of my invention, the various parts are disclosed. 10 designates an orange magazine or hopper, dish-shaped in configuration as at 11. In order to convey or feed oranges, by gravity, a spiral pathway 12 is provided which receives the oranges and cause same to descend down the hopper progressivley, as fast as the trap door, soon to be described, functions in the chute 15 which is attached at its upper end to the throat of the hopper and which depends vertically below the hopper.

The throat of the hopper is designated 14. The interior bore of the hopper is shown at 17. The chute is formed with an opening adapted to be closed by the door 16 to give access to its interior 17. The chute is also formed with a laterally projecting belly 18 which is a bulge rendered necessary by reason of the fact that an orange introduced from the hopper into the chute must be shunted laterally of the orange slicer and crusher element soon to be described, which operates coaxially in the chute. The interior of this bulge is designated 19.

The lower end of the chute 15 tapers conically, as at 20, and terminates in a juice discharging orifice which is closed by swivellable member 22 pivotally mounted at 21 to the chute. This member 22 may be a strainer. The juice upon emerging out of the lowermost chamber 23 in the tapering end of the chute issues out from the strainer member 22 and may be collected in a vessel or utensil positioned directly under the chute.

Just below the throat 14 of the hopper 10 is mounted a trap door 24 of suitable shape and size to extend transversely into the chute and bar oranges from dropping from the throat of the hopper into the chute and downwardly to the place where the crushing operation is to take place. This trap door has a slidable fit in oppositely arranged guide flanges 27 and 28 formed upon a seat 29 extending outside of the chute, and joined to a pair of flanking confining brackets 25 and 26 operatively secured upon the chute. Plate 24 is suitably slotted to accommodate rod 41.

Formed longitudinally of the slide member or trap door 24 along one margin thereof is a series of slots forming teeth 35 for the gear 34 to engage operatively, this gear being mounted upon a shaft 33 having its ends in the brackets 25 and 26. This shaft 33 projects laterally of one bracket where there is made fast thereupon a ratchet wheel 36. The spring 30 has one end 31 attached to the chute and its other end attached at 32 to the trap door 24 as shown in Figures 1 and 2.

Adapted to move vertically in the chute 15 is a plunger rod 41 being guided by vertically spaced apart guide members 45 secured upon the inner wall of the chute as shown in Figure 4. At its upper end this plunger rod has attached thereto one end of a coil spring 43, as at 42, while the other end of the spring is attached at 44 to a point on the chute. Directly opposite to said spring is also attached to the rod 41 a spring metal arm 37, as at 40, the free bearing end of which is formed with a successive series of serrations or teeth 38. Fasteners (not shown) pass through the holes in the arm 37 as at 39, and pass into the plunger rod. This spring arm 37 under its own flexure and springy construction is pressed into engagement with the ratchet wheel 36.

The plunger rod 41 projects below the chute and at its lowermost end is attached at 46 to a suitable foot operated or treadle member or lever 47 pivotally mounted upon a fixed mooring 48. The spring 43 normally holds the plunger rod 41 in elevated position in the chute which also elevates the treadle member 47 as shown in Figure 1.

The lower part of the bulge 18 of the chute 15 is formed with an opening 51, adapted to be closed by a door 49 having an integral lip handle 50. This door 49 has its inner end oscillatingly mounted upon a cross pin 55 having its ends journaled in oppositely arranged lugs 58 and 60 formed or mounted upon the chute exteriorly thereof. A spring 57 is coiled around the pin 55 and has one finger thereof 59 fixedly attached thereto and another and opposite finger attached fixedly to the lug 58. Recesses 56 in opposing edges of the door 49 clear the lugs 58 and 60, if desired.

This spring 57 normally holds the door 49 in closed relation to the opening 51. Mounted operatively upon the door 49 to make a unitary structure therewith, and at an obtuse angle thereto is a perforated plate 61, the holes in which are designated 63. This plate 61 is formed with a diametrically extending kerf or recess 62 centrally thereof. It is necessary and desirable that the plunger rod 41 have no rotative movement in the guide members 45. Made fast upon the shaft 55 at one end thereof is a ratchet wheel 60a, with which meshes operatively the serrations or teeth 54 formed upon another spring arm 52 attached at 53 at its lower end to the plunger rod 41.

When the door 49 is closed, the plate 61 is surmounted overlappingly upon a perforated rest or orange holder 66 formed as the top portion of a tubular body 64 fitted removably in the chute 15 and hence located opposite to the door 16 of the chute. The interior of the tubular body 64 is designated 65. Its top portion 66 is also formed with holes like holes 63 of the plate 61, and also formed with the diametrically disposed slot or kerf. The arrangement of the plate 61 and the seat 66 is such that the kerfs formed in both of them register at all times. The tubular body or orange holder rests with its bottom edge upon an annular bracket 67 mounted fixedly in the bottom of the chute 15.

The orange slicing and crushing member consists of a concavo-convex hemispherical head 69 whose inner concave surface 70 is to be seated surmountingly upon an orange. Depending from the head is a slicer blade 71, so as to extend transversely of this crusher head 69. The cutting edge 72 of the slicer blade is preferably disposed diagonally thereof. An integral curvilinear arm 68 rigidly connects this dual slicer and crusher member to the plunger rod 41 so the latter is positioned centrally in the chute.

Before functioning, all parts of the present machine occupy the positions shown in Figure 1. Here it will readily be seen that the chute is disposed in upright position being supported in this manner by suitable means not shown. The strainer member 22 closes the discharge orifice of the tapering end 20 of the chute. The foot treadle 47 is in up position. The slicer blade 71 is positioned just above the perforated plate 61. The trap door 24 is in a position barring delivery of oranges into the chute from the hopper 10. Spring arm 37 has its innermost tooth just out of engagement with the ratchet wheel 36, and spring arm 52 has its innermost tooth just out of mesh with ratchet wheel 60a.

In the use and operation of this fruit juicer the magazine 11 is filled with oranges which are disposed in the spiral guide 12 therein. In the normal position of the structure of this machine the plate 24 is spring-pressed to close the upper end of the chute. The plate 62 is disposed in overlying relation to the filter or screen 66 and the door 49 is closed. In this position the rod 41 is raised or elevated by the spring tension of the spring 43. The operation of the machine will be described as starting after the completion of one cycle of operation. An orange is disposed on the plate 61 and the sliding door 24 is closed. As the rod 41 is slid downwardly due to the action of the operator in pressing the treadle 47 downwardly, the knife 71 severs the orange and the crusher 70 will mash the orange against the plate 62 so that the juice therefrom will be strained through the strainer or filter 66 and be discharged through the lower open end 23. When the operator removes his foot from the treadle 27, the spring 43 will draw the rod 41 upwardly. As the rod 41 moves upwardly the teeth of the member 54 will engage with the ratchet 60a for rocking the door 49 downwardly and outwardly and raising the plate 61. The plate 61 will be pivoted about the pivot rod of the ratchet wheel 60a and the orange peels will be disposed out through the doorway 50.

During the operation of the door and plate 61 by the upward movement of the rod 41, the spring arm 37 will engage its teeth 38 with the ratchet wheel 33. As the rod slides upwardly the plate 24 will be slid outwardly against tension of the spring 31 and as the rod reaches its extreme uppermost position, the plate 24 is opened to admit another orange into the chute, the total elapsed time of the operation being substantially of a duration to permit the advancing of only a single orange. After the rod 41 reaches its extreme upper position the last or innermost teeth of the spring members 52 and 37 become disengaged from the ratchet wheels connected thereto and the springs 31 and 57 will close the door 24 and door 49. In this condition then the machine is in condition for the next cycle of operation.

I do not mean to confine myself to the exact details of construction herein set forth, but will cover all variations falling within the purview of the appended claims.

What I desire to claim and secure by Letters Patent is:

1. A device as described consisting of an orange magazine having a depending tubular chute, a spiral feeder for said oranges in said magazine, an orange holder in said chute, a trap door movably mounted in said chute in the throat of said magazine, an orange squeezer movable in said chute designed to impact an orange against said holder, foot controlled means for actuating said orange squeezer, means controlled by said last-named means for opening said trap door for release of an orange from said magazine into said chute, and means controlled by said squeezer means for ejecting the orange peel after an orange crushing operation.

2. A device as described consisting of an orange magazine having a depending chute, a fixed orange holder having apertures therein in said chute allowing orange juice to penetrate therethrough out of said chute, an orange slicer and squeezer movable in said chute into engagement with an orange on said holder, movable means in said chute for actuating said orange slicer and squeezer, resilient means opposing the operation of said actuating means, a trap door displaceable for admission of an orange from the magazine into the chute, means actuated by said movable means for operating said trap door, and means acting in time with said orange slicer and squeezer for ejecting orange peel from said chute.

3. A device of the kind described consisting of a dish-shaped orange magazine having a spiral path for moving an orange therein, a chute depending from said magazine and receiving oranges from said magazine, a trap door confining the oranges in said magazine, a fixed orange holder in said chute at its lower end, a tapering discharge end on said chute, a rod movable vertically in said chute, foot-operated means for depressing said rod, a spring for returning said rod after depression thereof, means actuated by said rod for squeezing an orange on said holder, said holder having provision for discharging the juices from oranges crushed thereupon out of said tapering chute discharge end, means acting in time with said orange squeezing operation to open the trap door automatically to drop an orange from the magazine upon said holder, and means operable automatically upon return of said rod by said spring for ejecting orange peels from said chute.

4. A device of the kind described consisting of a dish-shaped orange magazine, a chute depending therefrom having a tapering discharge end, an elongated rod extending downwardly in said chute and projecting therebelow, means guiding said rod in movement, means for depressing said rod, a spring automatically elevating said rod after depression thereof, a trap door in said chute confining oranges in said magazine but retractable to allow dropping of an orange from the magazine into said chute upon elevating of said rod, means carried by said rod for dejuicing said orange in said chute, and means operated by said rod as it is elevated for ejecting orange peel out of said chute.

5. A device as described consisting of a dish-shaped orange magazine having a depending chute, a trap door in said chute barring dropping of oranges out of said magazine into said chute, a rod guided for vertical movement in said chute, means below said chute for depressing said rod, a spring for automatically elevating said rod after depressing thereof, an orange engaging member carried by said rod for dejuicing an orange in said chute, a door movably mounted upon said chute, and means controlled by said rod as it is elevated for opening said door and ejecting orange peel out of the chute.

6. A device of the kind described consisting of a dish-shaped orange magazine, a chute depending vertically therefrom and having a tapering discharge end for orange juices, a rod guided for vertical movement in said chute, a treadle for depressing said rod, a spring for automatically elevating said rod after depressing thereof is completed, an orange rest fixedly mounted in said chute and having perforations for allowing escape of orange juices, means for dejuicing an orange dropped into the chute in contact with said orange rest, means operated by said rod as it is elevated for permitting one orange to drop from the magazine into the chute, a door in said chute, means for opening said door, means operated by said rod for actuating the last-named means, and means operated by said door for ejecting orange peel out of the chute.

7. A device as described consisting of a dish-shaped orange magazine, a chute connected to the lower end of said magazine, a trap door in said chute located at the throat of said magazine for closing the same normally, means conveying oranges progressively down the magazine towards the trap door, said chute having a lateral belly, said belly having an opening, a door movably mounted so as to close said opening, an orange holder in said chute carried by said door and perforated to admit juices therethrough, a fixed perforated rest in said chute surmounted by said orange holder when said door is closed, means for sliding the trap door to open position, means for tilting said other door to open position whereby orange peel is ejected by gravity out of said opening in said belly, an orange crusher movable in said chute longitudinally thereof and adapted to engage an orange dropped upon said holder, foot-operated means for actuating said orange crusher actuating means, means controlled by said orange crusher for actuating said trap door sliding means, and means acting in time with said orange crusher for opening the door in said chute belly.

8. A device of the kind described consisting of a dish-shaped orange magazine, a chute depending from the throat of said magazine, a trap door in said chute under said magazine and adapted to bar dropping of oranges from the magazine into the chute, a transverse perforated orange rest fixedly mounted at the lower end of said chute, a rod movably guided in said chute and passing through said orange rest, a treadle for depressing said rod, a spring for returning said rod after being depressed, means for crushing an orange upon said rest and controlled by said rod, means adapted to engage said trap door to retract same to admit an orange from the magazine into the chute for placement upon said orange rest, means actuated by said rod for causing the retraction of said trap door, and means operated by said rod for ejecting orange peel from said rest out of the chute.

9. A device of the kind described consisting of a dish-shaped orange magazine, a chute depending from the throat of said magazine, and having a tapering discharge end at its lower part, a perforated orange rest fixedly mounted transversely in said chute, said chute being formed with an opening adjacent said rest, a door movably mounted upon said chute for closing said opening and carrying a perforated orange plate which surmounts said rest when the door closes said opening, means for tilting said door and plate to open the door and cause said plate to lift peels resting thereupon to be ejected by gravity out of said opening, means in said chute adapted to engage an orange admitted by said magazine into said chute, upon and against said plate to dejuice same, and means controlled in timed relation with the latter means for barring oranges from entering said chute.

10. A device as described consisting of a dish-shaped orange magazine having a tubular chute depending therebelow, a rod movably guided vertically in and through said chute, foot-operated means for depressing said rod, a spring connected to said rod for elevating it, means admitting one orange at a time out of the magazine into the chute, a perforated plate at the lower end of the chute extending transversely thereof, a combination orange crushing and slicing unit carried by said rod for engagement with the orange upon said plate, a rocking perforated plate on said rest for raising orange peel thereon for gravity ejection, said chute having a hinged door opposite to said rest, means actuated by said rod for actuating said door to open the same as said plate races peel to be ejected out of said opening, and means controlled by said rod for operating the orange admitting means automatically.

11. In a device as described, an orange receiving chute, a tubular orange rest in said chute having a perforated top extending transversely of said chute, said chute tapering to a discharge opening below the orange rest, a strainer closing the tapering end of said chute, a door openable upon said chute to give access to said tubular rest, means removably supporting said orange rest, a rod slidably mounted in said chute, and means operated by said rod for crushing an orange against said rest.

12. In a device as described, an orange receiving chute having a tapering discharge orifice for juices, a perforated orange rest fixedly mounted transversely in said chute, said chute being formed with an opening opposite to said rest, a door hingedly mounted so as to unbar and close said opening, a perforated plate mounted to swing with said door and surmounting said rest when the door is closed, a ratchet for swinging said door and plate when rotated, a rod movably mounted in said chute, means carried by said rod for crushing an orange upon said plate, and pawl means carried by said rod for rotating said ratchet for swinging said plate and door, the latter to open position.

13. In a device as described, an orange receiving chute having a slot at its upper end, a trap door adapted to slide into said slot and into said chute, a rod in said chute slidably mounted therein laterally of said trap door, a spring attached to said chute in opposition to which said trap door moves to open position, rotary means for actuating the movement of said door slidably out of said slot, and means carried by said rod for rotating said rotary means.

ROBERT E. LARSEN.

REFERENCES CITED

The following references are of record in the file of this patent:

UNITED STATES PATENTS

| Number | Name | Date |
| --- | --- | --- |
| 2,369,305 | Lobasso | Feb. 13, 1945 |